United States Patent

Mima et al.

[11] Patent Number: 6,065,040
[45] Date of Patent: May 16, 2000

[54] COMPUTER SYSTEM HAVING AGENT RETRACTING METHOD AND AGENT RETURNING METHOD

[75] Inventors: Yoshiaki Mima, Musashino; Kazuya Kosaka, Sagamihara; Gaku Yamamoto, Tokyo, all of Japan

[73] Assignee: International Business Machines Corporation, Armonk, N.Y.

[21] Appl. No.: 08/984,154

[22] Filed: Dec. 3, 1997

Related U.S. Application Data

[60] Provisional application No. 60/051,777, Jul. 7, 1997.

[51] Int. Cl.[7] .......................... G06F 13/00; G06F 13/368
[52] U.S. Cl. ...................... 709/202; 709/206; 709/217; 707/4; 707/10
[58] Field of Search .................................. 709/202, 217, 709/206; 395/200.32, 200.47, 200.36; 707/100–103

[56] References Cited

U.S. PATENT DOCUMENTS

| | | | |
|---|---|---|---|
| 5,603,031 | 2/1997 | White et al. | 707/100 |
| 5,862,325 | 1/1999 | Reed et al. | 709/201 |
| 5,881,232 | 3/1999 | Cheng et al. | 709/217 |
| 5,887,171 | 3/1999 | Tada et al. | 709/206 |

OTHER PUBLICATIONS

T. Finin et al., "KQML as an Agent Communication Language", ACM, pp. 456–463, 1994.
K. Sugawara et al., "Agent–oriented Architecture for Flexible Networks", IEEE pp. 135–141, 1995.
J. Park et al., "A Generic Manager/Agent Architecture for TMN Applications", IEEE pp. 794–798, 1994.

*Primary Examiner*—Frank J. Asta
*Assistant Examiner*—Ivan C. Pierce, III
*Attorney, Agent, or Firm*—Whitham, Curtis & Whitham; Kevin M. Jordan

[57] ABSTRACT

An apparatus and method retracts a mobile agent from a second execution environment back to a first execution environment, the retraction being performed by the first environment sending a retraction request, and the second execution environment establishing a connection to the first execution environment in response. The second execution environment searches for an agent under its control corresponding to an agent identity in the retraction request, and converts the corresponding agent, if located, to a bit sequence and returns the bit sequence to the first execution environment via the connection. Sending the bit sequence through the established connection safely alleviates firewall issues because a connection is established from the inside of the firewall to the outside.

23 Claims, 8 Drawing Sheets

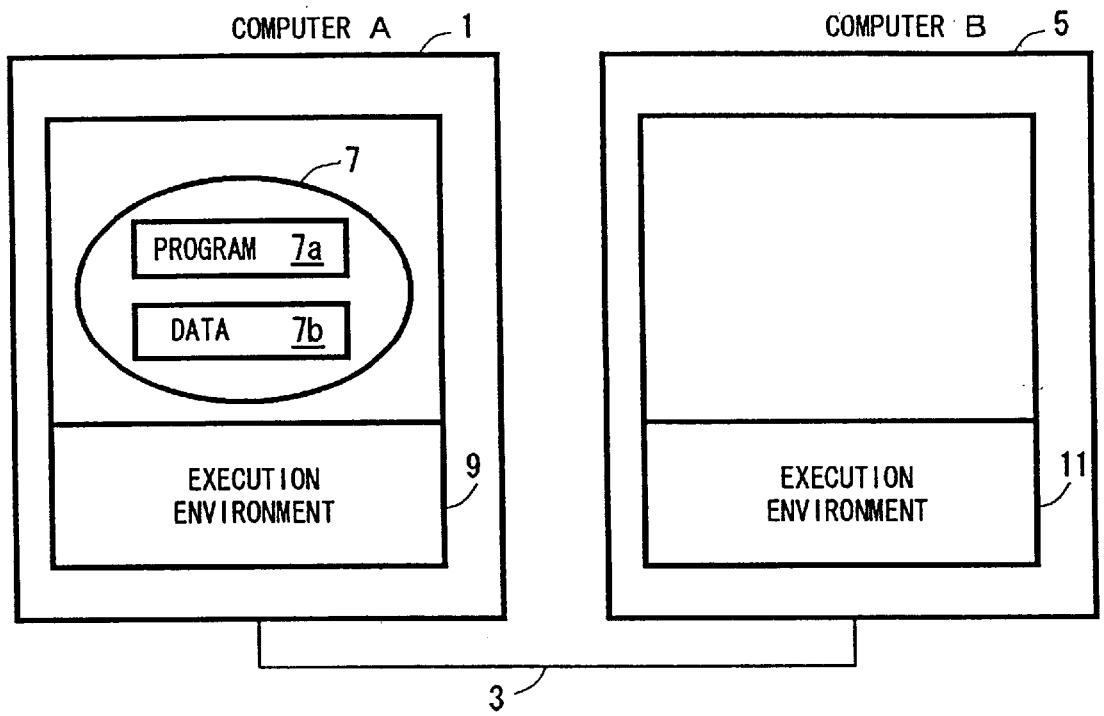
F I G. 1
| ID | ACTIVE/INACTIVE | POINTER |
|---|---|---|
| AGENT X | ACTIVE | 9090 |
| AGENT Y | INACTIVE | 0120 |
| AGENT Z | ACTIVE | 9050 |
| ⋮ | ⋮ | ⋮ |
F I G. 5

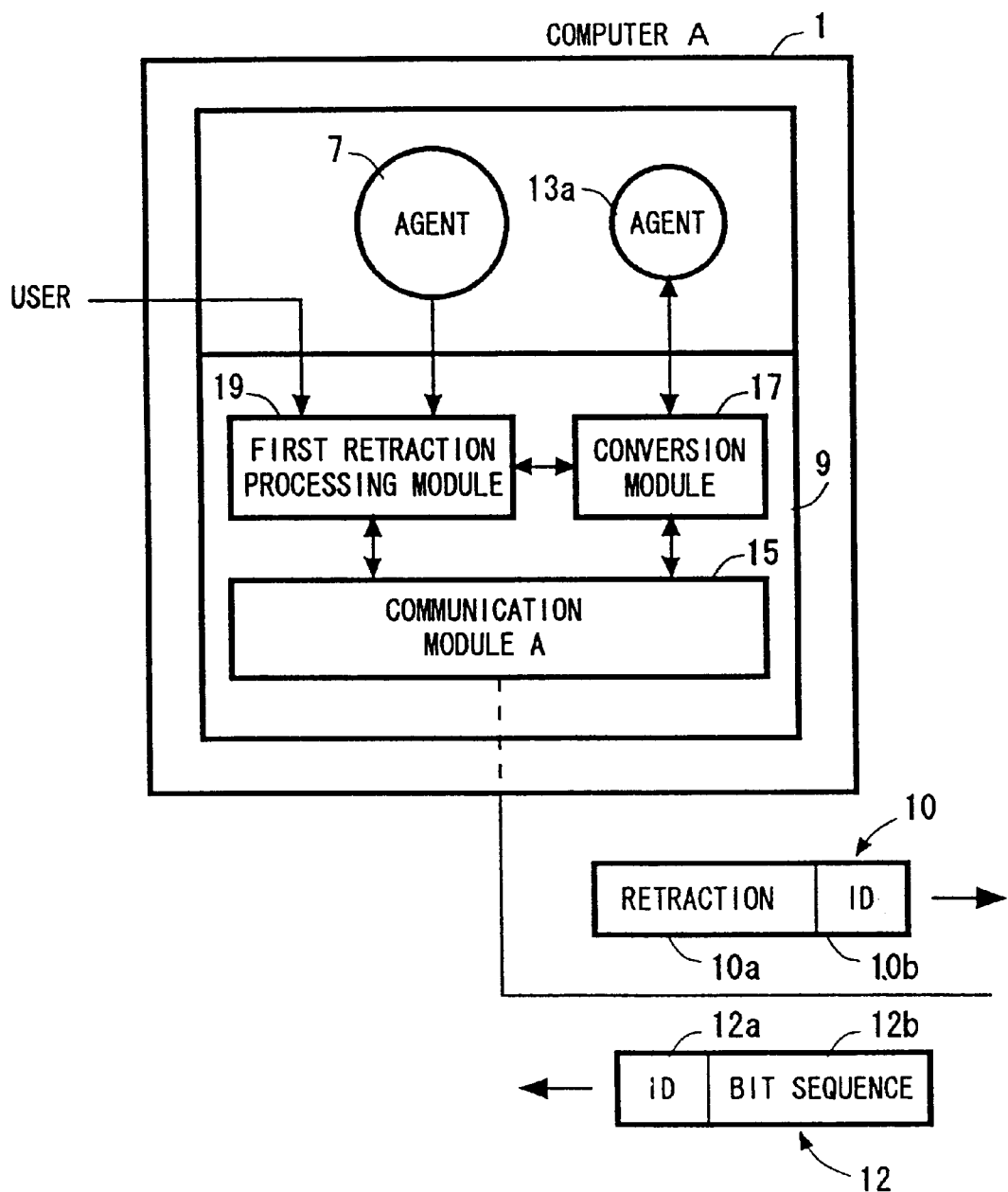
F I G. 3

| ID | DESTINATION ADDRESS |
|---|---|
| AGENT W | WWW.YAMATO.TRL.IBM.COM |
| AGENT V | WWW.YORKTOWN.IBM.COM |
| ⋮ | ⋮ |

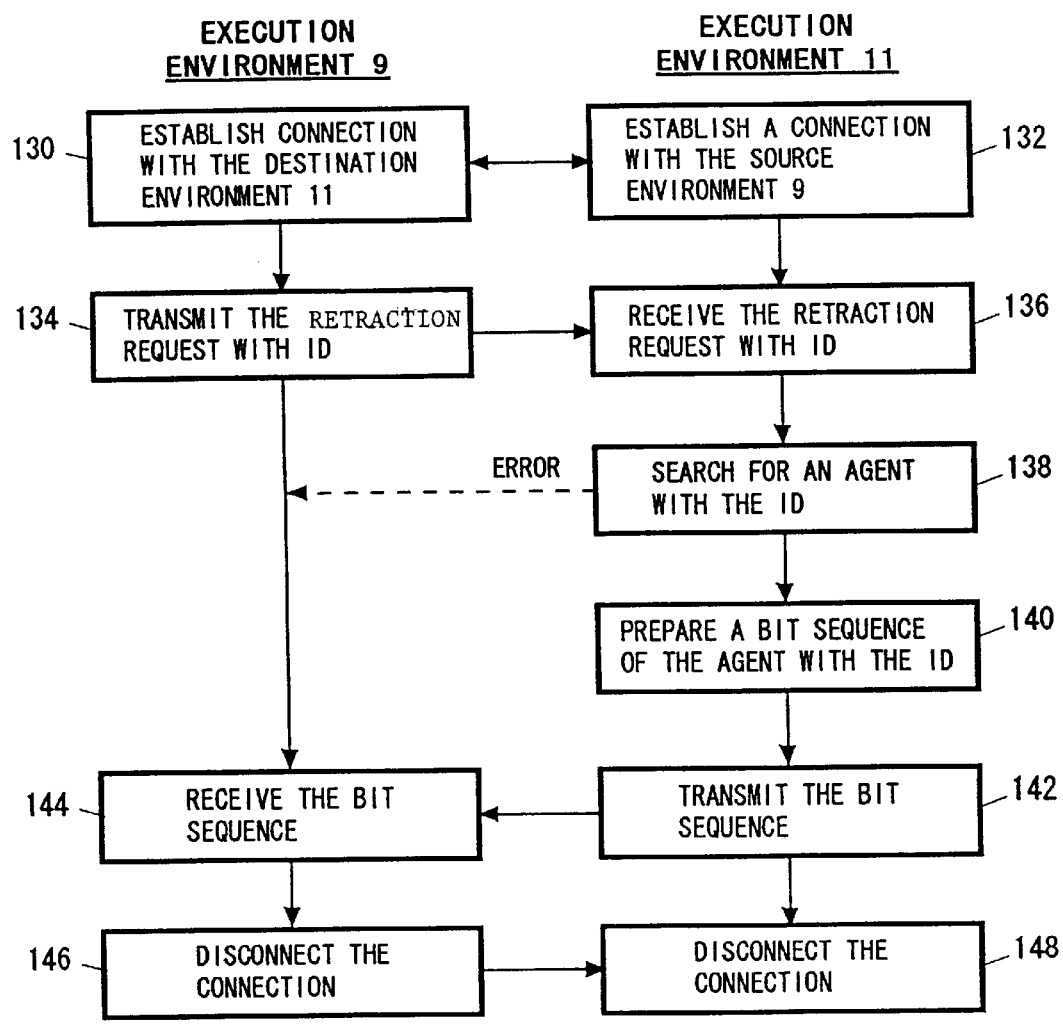
F I G. 7

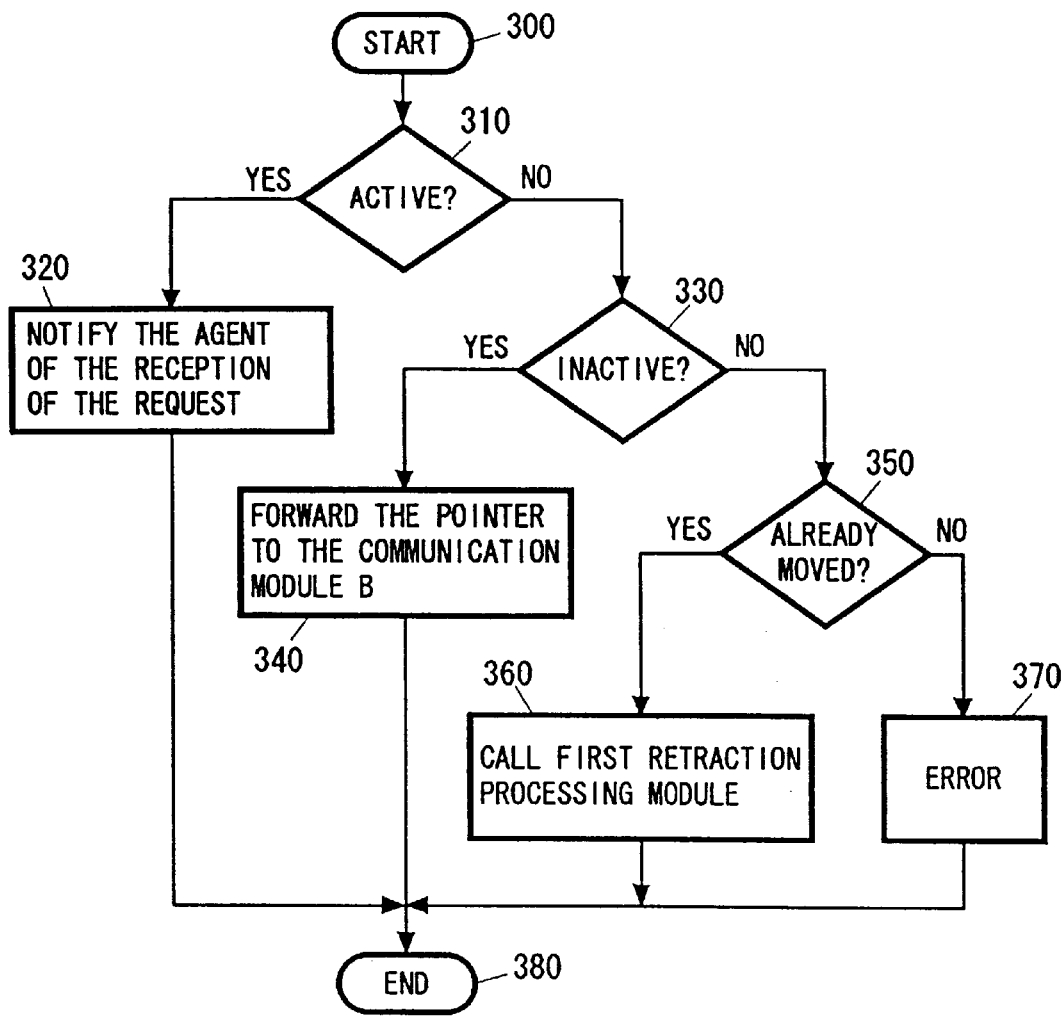
F I G. 9

COMPUTER SYSTEM HAVING AGENT RETRACTING METHOD AND AGENT RETURNING METHOD

RELATED APPLICATIONS

This application is filed as a continuation of Provisional Application Serial No. 60/051,777, filed Jul. 7, 1997, the entirety of which is hereby incorporated by reference.

FIELD OF THE INVENTION

The present invention relates to a mobile agent method and, more specifically to a method for retracting a mobile agent to a desired computer.

DESCRIPTION OF THE RELATED ART

A mobile agent, which has a program and has data indicating a state of the agent and the like, performs a given activity on an execution environment for the mobile agent and then moves to another execution environment either in response to an agent-internal or autonomous instruction or in response to an instruction from some other entity. An example is shown in FIG. 1, where computer A, labeled as item 1, and computer B, which labeled item 5, are connected to each other via a network 3. Computers A and B may be any type of programmable digital computer such as, but not limited to, an IBM compatible computer, having one or more processors, a main memory, and a storage device such as a hard disk device, connected and programmed to execute various programs. Further, since each of the computers A and B performs communication via the network 3, each has a network interface or communication adaptor or the like. In computers A and B, programs that provide respective mobile agent execution environments 9 and 11 are executed. Such programs and the various features generally required of the execution environments are well known in the art. For further reading on agent-based execution environments, a reader can refer to various publications, treatises and issued patents such as, for example, U.S. Pat. No. 5,603,031.

Referring to FIG. 1, an agent 7 is executed on the mobile agent execution environments 9 and 11. The agent 7 includes a program portion 7a and a data portion 7b which indicates parameter values and other state information and the like. Although FIG. 1 shows only one agent 7, two or more agents may be executed concurrently and may exchange messages, as is well known in the art.

Referring to FIGS. 1 and 2, a process will be described that is executed by the execution environments 9 and 11 when the agent 7 moves from computer A, shown as item 1, to computer B, shown as item 5. For this example description, the terms "item 1" and "computer A" are interchangeable, as are the terms "item 5" and "computer B". The process is initiated by an autonomous instruction or in response an instruction from another entity, and begins by agent 7 first informing the execution environment 9 of a movement destination. Then, at step 100, the execution environment 9 converts the program portion 7a and the data portion 7b of the agent 7 into a bit sequence with a conversion module that is incorporated in the execution environment 9 itself. For this description, the term "bit sequence" means the bit form that an agent such as agent 7 is placed into for communication over the network. At steps 102 and 104, the execution environment 9 establishes a logical connection with the execution environment 11. At step 106, the bit sequence of the agent 7 is transmitted to the execution environment 11 via the established connection.

The execution environment 11 receives the bit sequence of the agent 7 at step 108, and converts the bit sequence into a form executable on the execution environment 11 at step 110.

At step 112, when the new instantiation of agent 7 on computer B starts its activity on the execution environment 11 there is a determination as to whether or not the agent and/or its activity are successful and, if so determined, the execution environment 11 returns an acknowledgment message ACK to the execution environment 9. Upon receiving the acknowledgment message ACK at step 114, the execution environment 9 finishes its process for movement of the agent 7 and disconnects the connection with the execution environment 11 at step 116.

After performing a given activity on the execution environment 11, agent 7 on environment 11 may be moved again to still another execution environment according to a process similar to the process of FIG. 2. Conventionally, when the environment 11 instantiation of agent 7 returns to the execution environment 9, either by autonomous means or in response to an instruction from another entity, a process as shown in FIG. 2 is again executed. More particularly, agent 7 necessarily returns to the execution environment 9 as long as there is no failure in the network 3. However, if the network 3 is one such as the Internet, a mechanism known in the art as a firewall is provided to prevent an unauthorized access from a third party. If a firewall is set for computer A which includes the execution environment 9 as a return destination of agent 7, the execution environment 9 which is inside the firewall can establish a connection with the execution environment 11 in computer B as shown in FIG. 2, where the execution environment 11 is located outside the firewall. However, conversely, the execution environment 11 which is outside the firewall cannot establish a connection with the execution environment 9 which is inside the firewall. Therefore agent 7 cannot return to the original execution environment 9, either by autonomous action or in response to an instruction from another entity, if return is from the execution environment 11.

As stated above, an exemplary conventional mobile agent system is described in detail by, for example, U.S. Pat. No. 5,603,031, ("the '051 patent). However, the '051 patent does not recognize or suggest anything about the above problem because it is not directed to a network having a firewall.

SUMMARY OF THE INVENTION

An object of the present invention is therefore to provide a method for retracting an agent that has moved to another execution environment by a retraction request from a requesting execution environment.

Another object of the invention is to provide a method which enables an agent that has moved to an execution environment outside a firewall to be retracted when necessary.

According to the invention, an agent that has moved to another execution environment is retracted by utilizing a part of the mechanism shown in FIG. 2. More particularly, to perform a retraction, a connection is established from a retraction source and the retraction source makes a bit sequence of the agent returned via the connection while maintaining the connection. With this configuration, no problems occur even if a firewall exists because a connection is established from the inside of the firewall to the outside. Further, since data is returned via the established connection, a bit sequence of an agent reaches the retraction source safely. This configuration is greatly different from the mechanism of FIG. 2 as to what is transmitted from the retraction source, what is transmitted from the agent movement destination, and the operation of the agent execution environment.

The term "retraction", as used in this description, is not limited to meaning only an agent to its original location. For example, when an agent has moved from computer A to computer B, computer C may issue a retraction request to computer B.

A first embodiment of the invention comprises a first agent execution environment in a computer system connected to a network, the first execution environment including a module for establishing a connection with a second agent execution environment in a second computer system connected to the network. The first execution environment of this embodiment further comprises a module for transmitting a retraction request including an ID of an agent under management of the second agent execution environment via the established connection, and a module for receiving a bit sequence of the agent identified by the ID in the retraction request, the bit sequence being transmitted from the second agent execution environment in response to the request from the first environment, via the established connection. This embodiment provides for moving an agent generated for information collection to an execution environment of another computer with instructions for that agent to perform the information collecting activity in the other execution environment, and for retracting the agent when necessary, and for referring to the agent's data upon the retraction.

The first agent execution environment may further comprise a conversion module for converting an agent being executed on the first agent execution environment into a bit sequence for storage or for transmittal via the network. Conversely, the first agent execution environment may further comprise a conversion module for converting a bit sequence of an agent into a form executable on the first agent execution environment.

According to another embodiment of the invention, a first agent execution environment in a computer system to be connected to a network comprises a connection establishing module for establishing a connection with a second agent execution environment in a second computer system connected to the network. The connection is formed in response to a connection establishment request from the second agent execution environment. The first execution environment of this embodiment further comprises a search module for performing a search on agents under management of the first agent execution environment in response to reception of a retraction request including an ID of an agent, wherein the retraction request is transmitted from the second agent execution environment via the established connection. The first execution environment of this embodiment further comprises a module for transmitting a bit sequence of an agent having the same ID as the ID in the retraction request from the second execution environment, the transmission being via the established connection.

Generally, an agent execution environment has a mechanism for identifying the agents existing in that execution environment. Since the execution environment may simultaneously contain multiple agents, received from various other execution environments, it is therefore preferable that agents are given more global IDs, where "global" means with respect to the network. However, with the present invention, although it is preferable that each of such IDs be unique within the network, such uniqueness is not strictly required. More particularly, further execution environments according to the present inventions comprise a search module for searching among agents being executed in an environment, and a module for notifying the agent having the same ID as the ID in the retraction request from the second execution environment of the reception of the retraction request, if the agent having the same ID is being executed. Subsequently, the agent having the same ID as the ID in the retraction request is converted into a form transmittable to the second execution environment by a conversion module for converting an agent into a bit sequence.

A further embodiment of the above-described search module comprises a module for searching among agents not being executed, and a module for notifying the transmitting module of a storage location of the agent having the same ID as the ID in the retraction request if the agent having the same ID is not being executed. This embodiment accommodates operational scenarios in which an agent becomes inactive after its movement to another execution environment, and is subsequently placed in that environment's storage.

Another embodiment of the invention includes a first agent execution environment further comprising a storage area for storing an ID of an agent, and a movement destination thereof. For this embodiment the above-described search module may further comprise a module for searching the storage area, and a module for instructing the connection establishing module to establish a connection with a third agent execution environment that is the movement destination of the agent having the same ID as the ID in the retraction request if the agent having the same ID has already moved. This configuration enables retraction of an intended agent even if it has moved to the third execution environment.

Further to the above-embodiment, a number of otherwise useless entries is reduced by programming or otherwise configuring the above-mentioned storage area to store only movement destinations of agents other than agents that have moved in response to a retraction request.

An alternative of the above-described conversion module is structured to convert a bit sequence of an agent into a form executable on the first agent execution environment.

A further embodiment of the invention structures an agent with an ending operation module, wherein when the agent is moved to another execution environment, and the other execution request receives a retraction request, the agent receives a notification from the other execution environment when that retract request is received, and the agent ending operation module carries out retraction operations.

A still further embodiment structures an agent to comprise a module for notifying the first agent execution environment that a process of the ending operation module has finished. In one alternative of this embodiment, the retracted agent itself contains a predefined ending operation method for the retraction. In another alternative, the predefined ending method for the retraction is stored in a storage device on the network. The predefined ending operation is invoked in response to a notification that is output from the first agent execution environment when the first agent execution environment receives a retraction request including an ID of the agent, via a connection with the second agent execution environment.

The embodiments of the invention are described as a flow process, and it will be understood that the flow is readily implementable as a computer program for executing such a process. As understood by one of ordinary skill in the art, the computer program is storable in any of the known storage media, such as a CD-ROM or a floppy disk.

BRIEF DESCRIPTION OF THE DRAWINGS

The foregoing and other objects, aspects, and advantages will be better understood from the following description of preferred embodiments of the invention with reference to the drawings, in which:

FIG. 1 is a block diagram showing a conventional network configuration;

FIG. 3 is a block diagram showing an example of a configuration in an apparatus of the present invention;

FIG. 5 shows an example of a table for managing agents;

FIG. 7 is a flowchart showing operations of the apparatuses of FIGS. 3 and 4;

FIG. 9 is a flowchart showing a search process of a second retraction processing module 29.

DETAILED DESCRIPTION OF THE EMBODIMENTS

Figure 2:
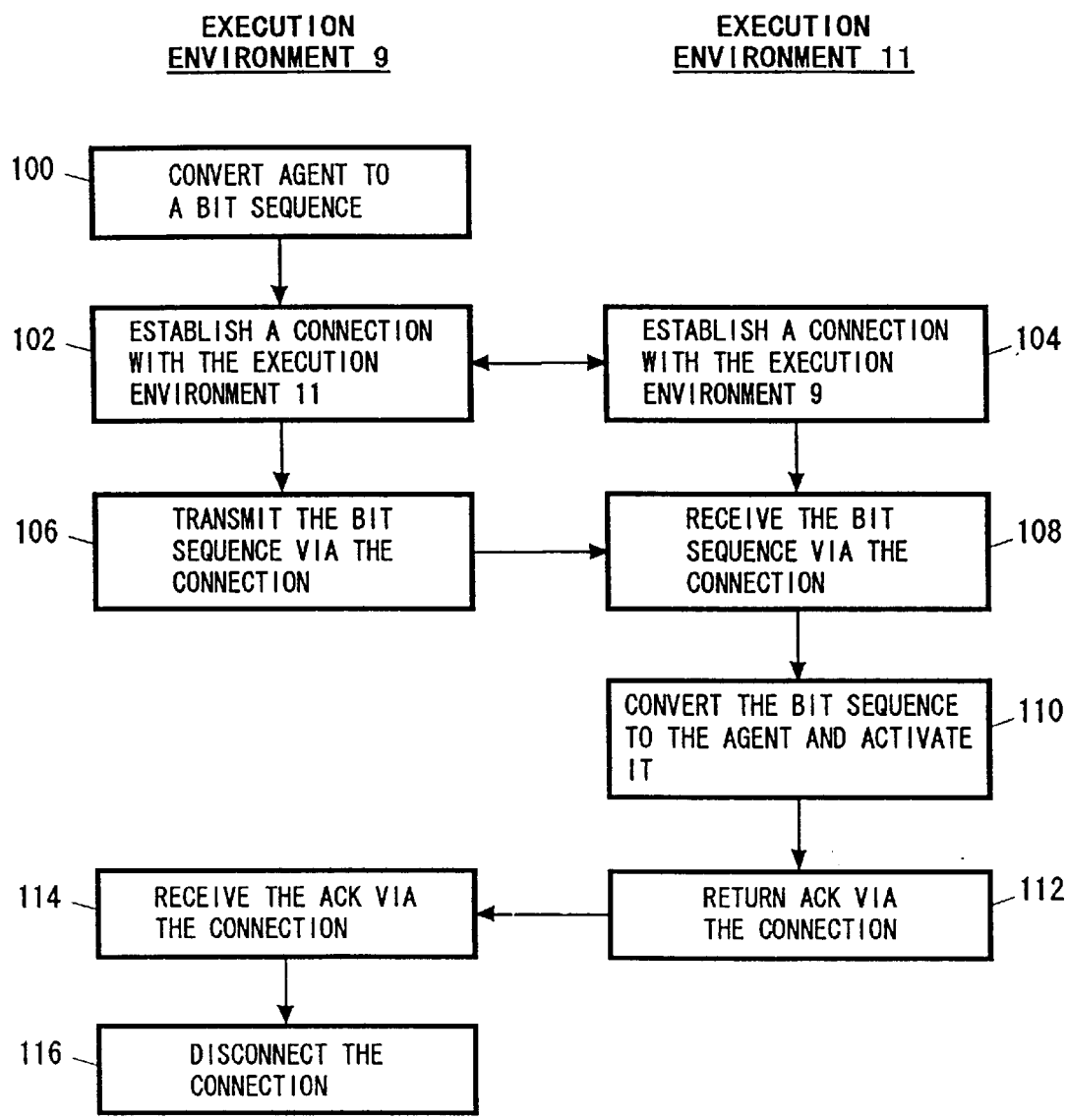
FIG. 2 is a flowchart showing a process executed by the system of FIG. 1.

A first embodiment of the invention will be described in reference to FIGS. 3–10. FIG. 3 shows computer A, labeled as item 1, having an arrangement of labeled modules for performing a retraction of an agent from another execution environment. The components of FIG. 3 which are same as those in FIG. 1 are given the same reference symbols. Further, for purposes of this description, the term "computer A" and the term "item" 1, are interchangeable as are the terms "computer B" and "item 5", unless otherwise stated.

Referring to FIG. 3, computer A includes an agent execution environment 9, and an agent 7 exists in the execution environment 9. As previously stated, programs that generate mobile agent execution environments, and the general requirements of such execution environments are well-known in the art, See, for example, U.S. Pat. No. 5,603,031 issued to White et al., and references cited therein. Further, an example a well-known method for converting an agent into its bit sequence and a well-known method for performing an opposite operation is described in "Pickling State in the Java Systems," The 2nd USENIX Conference on Object-Oriented Technologies, 1996. Therefore, to enable a ready understanding of the invention by one of ordinary skill in the art, the description of the known aspects of the execution environment, is omitted.

As shown by FIG. 3, the modules comprising the execution environment 9 are a first retraction processing module 19, a conversion module 17, and a communication module A, labeled as item. Referring to FIG. 1, computer A and computer B are connected to a network 3.

A processing flow of an agent 7 within the execution environment 9 of computer A as shown on FIG. 3, will be described. Referring to FIG. 3, the ID of an agent to be retracted and a computer as a movement destination of the agent are specified by a user or by the agent 7. Although not shown by FIG. 3, there are foreseeable cases where a plurality of agent execution environments exist in a single computer, such as computer A. Therefore, in general, an execution environment is specified. For example, the entity that orders the retraction of agent 7 may be the user himself who moved an agent, or an agent (not shown) functioning as a parent agent and which generated an agent such as agent 7 as a slave agent and moved the slave agent. Usually, the agent execution environment 9 manages, in certain form, the ID of an agent under its management. On the other hand, the ID of an agent to be retracted needs to be one that can be identified in the entire network where the agent moves. However, it is not necessary to assure that the ID of an agent to be retracted is perfectly unique.

The first retraction processing module 19 receives a retraction request. The first retraction processing module 19 instructs communication module A, item 15, to establish a logical connection with an execution environment where an agent to be retracted currently exists. Communication module A, item 15, establishes, by a known method, a connection with the execution environment in a computer where the agent to be retracted exists. If a connection cannot be established, communication module A returns an error to the first retraction module 19, which then notifies the user or the agent 7, if the agent 7 initiated the retraction request, of the occurrence of the error. This type of error notification is also performed when an error is returned from the execution environment where the agent to be retracted exists. When communication module A, item 15, has established a connection with the execution environment where the agent to be retracted exists, the first retraction processing module 19 instructs the communication module A to output a retraction request 10 including the ID of the agent to be retracted. Communication module A, item 15, then transmits the retraction request 10 including a portion 10a which indicates that the request 10 is a retraction request and an ID 10b of the agent to be retracted. While holding the established connection, communication module A, item 15, waits for a bit sequence of the agent identified for retraction to be transmitted to it via the network 3. Accordingly, if the retraction activity in the execution environment where the agent to be retracted exists finishes without any problems, an ID 12a and a bit sequence 12b of the agent to be retracted are transmitted via the network 3, and received by the requesting communication module A, item 15.

After the communication module A, item 15, confirms that the received ID is the same as the ID of the retraction request, the communication module A forwards the bit sequence 12b of the agent to be retracted to the conversion module 17. At this time point, communication module A may disconnect the connection, either after transmitting a acknowledge message to the execution environment where the agent to be retracted existed via the network 3 or without transmitting any acknowledge message.

The conversion module 17, after receiving the bit sequence 12b, generates an agent 13a by converting the bit sequence 12b of the agent into a form executable on the execution environment 9. Thereafter, the agent 7 or the user, whichever issued the retraction request, extracts necessary information from the agent 13a by transmitting a proper message to it. Although in the above description communication module A, item 15, forwards the bit sequence 12b to the conversion module 17, a further embodiment of the module 17 stores the bit sequence 12b itself in a storage device such as, for instance, a hard disk, in computer A, item 1, in response to an instruction from the first retraction module 19, for instance. Another embodiment of the conversion module 17 notifies the first retraction processing module 19 upon completion of its conversion processing, and the module 19 then notifies the agent 7 or the user of the completion of the retraction.

Another embodiment of the conversion module 17 performs a process of converting the agent 13a from a form being executed into a bit sequence that can be transmitted via the network 3 when the agent 13a is first moved to another execution environment. It is understood that all of the above-identified embodiments of the conversion module 17 can be embodied in a single conversion module.

Figure 4:
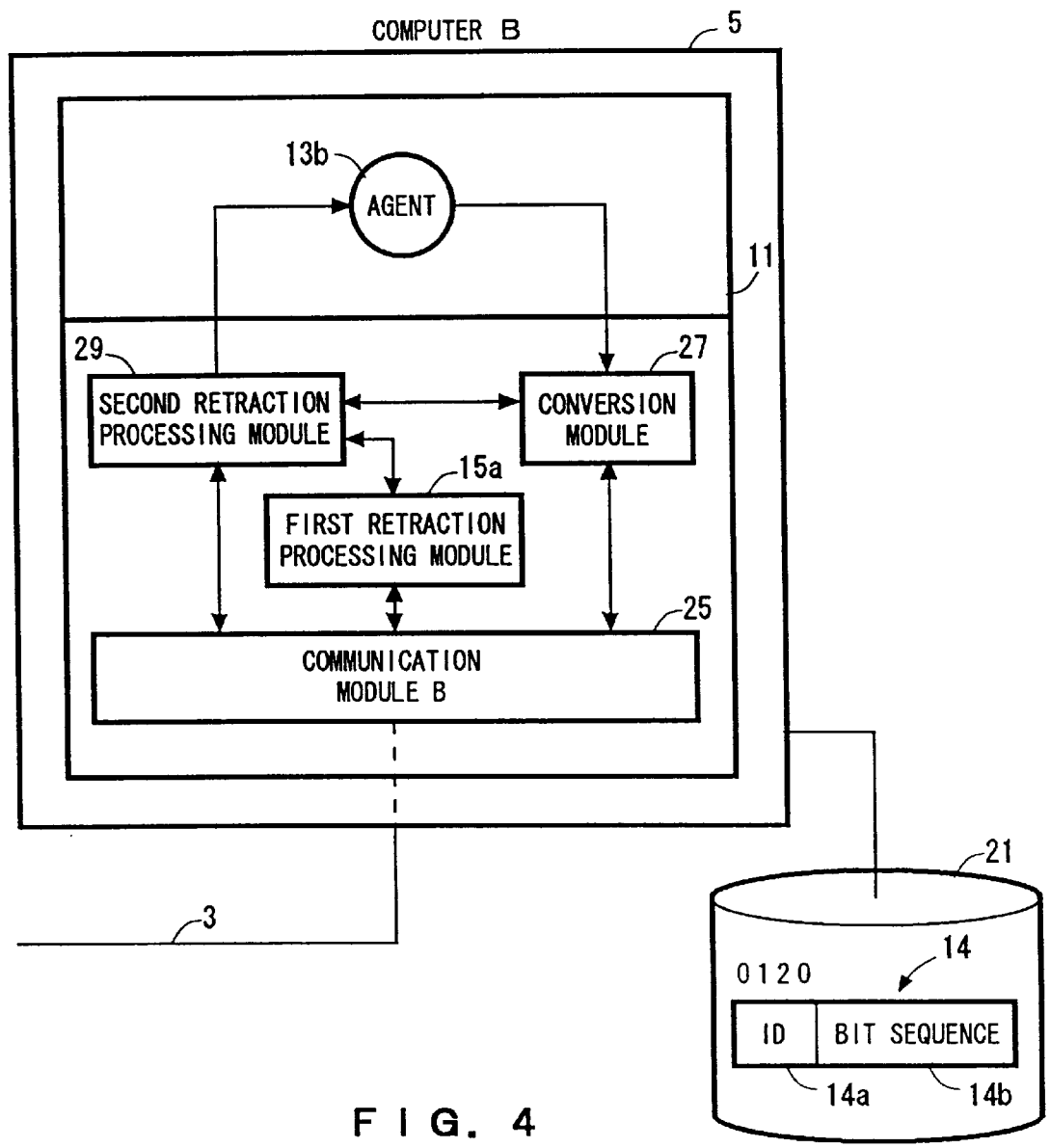
FIG. 4 is a block diagram showing an example of a configuration in an apparatus of the invention.

Referring to FIG. 4, the configuration of computer B, labeled as item 5, including an execution environment where an agent to be retracted exists will be described. As in the case of FIG. 3, the components in FIG. 4 which are same as those in FIG. 1 are given the same reference symbols. As shown in FIG. 4, computer B is connected to the network 3. An agent execution environment 11 is constructed in computer B. Computer B further has a disk device 21. The execution environment 11 of computer B includes communication module B, shown as item 25, a second retraction processing module 29, a conversion module 27, and a first retraction module 15a. The first retraction module 15a performs the same operation as the first retraction module 15 in the execution environment 9 of computer A. The incorporation of the first retraction module 15a in the execution module 11 is optional (described later). The conversion module 27 performs the same operation in the execution environment 11 as the conversion module 17 performs in the environment 9.

The agent 13b is a retraction subject existing in the execution environment 11. The agent 13b is the same as the agent 13a shown in FIG. 3. Although FIG. 4 shows the agent 13b in an active state in the execution environment 11, the following applies where the agent 13b is not in an active state, with modifications as to retrieving the agent into an active state.

An operation performed in computer B in response to a retraction request will be described.

When receiving a connection request from an execution environment of some other computer, such as computer A, communication module B, item 25, establishes a connection with that execution environment if there are no problems. If the execution environment that issued the connection request is to perform a retraction, it transmits the retraction request 10 (see FIG. 3) including the ID of an agent to be retracted via the established connection. Communication module, item 25, receives the retraction request, notifies the second retraction processing module 29 of the reception of the retraction request 10, and forwards the ID that is included in the request 10 to the second retraction processing module 29. The second retraction processing module 29 then searches among the agents in the execution environment 11, based on the ID received from the communication module B, item 25. More particularly, the module 29 checks whether the agent identified as the retraction subject exists in the execution environment 11 and whether it is in an active state. As mentioned above, the retraction operation applies to inactive agents and, therefore, the term "in the execution environment" encompasses inactive agents.

As described above, an execution environment such as 11 is usually constructed so as to be able to recognize, in certain form, an agent under its management. However, in the present invention, since an agent that is given a more global ID comes from the outside, the agent is managed by using such an ID. The search is facilitated by the execution environment holding, in the form of a table, the ID of a transmitted agent, its acting state, and its pointer. This aspect of the search feature will be described in reference to FIG. 5.

Referring to FIG. 5, agent X is shown in an active state and the corresponding table pointer is "9090." Agent Y is in an inactive state and its pointer indicates "0120." Agent Z is in an active state and its pointer indicates "9050." This type of table may be managed by the second retraction processing module 29, communication module B, item 25, or some other component module of the execution environment. Upon being notified of the reception of the retraction request 10, the second retraction processing module 29, searches this table, assuming that module 29 is the table manager. If the ID column of the table has the same ID as the ID that is included in the retraction request 10, the second retraction processing module 29 continues the retraction processing. If the table does not have the same ID as the ID included in the retraction request 10, the second retraction processing module 29 notifies the communication module B, item 25, of the occurrence of an error. Communication module B, item 25, transmits, via the established connection, the error to the execution environment that transmitted the retraction request 10. A further embodiment, described later, determines if the agent identified by the retraction request has moved to another execution environment before sending the error message.

When the second retraction module 29 finds an entry in the FIG. 5 table having the same ID as the agent that is the retraction subject in the request 10, the second retraction processing module 29 checks the agent's acting state. If the module 29 finds that the subject agent is in an active state, the second retraction processing module 29 notifies the agent that the retraction request 10 has been received, by using the pointer in the FIG. 5 table.

On the other hand, if the second retraction processing module finds an entry in the FIG. 5 table having the same ID as the agent that is the retraction subject, but the entry shows an inactive state, the second retraction processing module 29 forwards the corresponding pointer from the table to the communication module B, item 25.

Before describing the subsequent processing by the communication module B when a subject agent is inactive, a general summary of inactive agent storage is appropriate. Generally, an agent in an inactive state is stored, as a bit sequence, in a storage device such as the disk device 21. Therefore, prior to being stored the inactive agent converted into a bit sequence by the conversion module 27. Further, when the agent is made inactive stored the second retraction processing module 29, the conversion module 27, or other module (not shown) that performs disk I/O changes the FIG. 5 table entry corresponding to the agent from "active" to "inactive" and stores a storage location in the disk device 21 as a pointer. An example is shown in FIG. 4, as an ID 14a and a bit sequence 14b of an inactive agent stored in the disk device 21 at a storage location "0120."

Referring to the examples of FIGS. 4 and 5, the agent ID "0120" identified by the retraction request 10 is listed by the FIG. 5 table as inactive, and is stored as agent 14 in the storage device 21. The second retraction processing module 29, in response to identifying the inactive state, forwards the corresponding table pointer to the communication module B, item 25. The communication module B, based on the pointer data, takes out the agent 14, in its inactive state, from the storage location "0120," and transmits the bit sequence of the agent via the connection that has already been established.

On the other hand, when the agent identified by the retraction request is an active agent, such as shown by agent 13b of FIG. 4, the second retraction processing module 29 notifies the active agent 13b of the retraction request, and the agent 13b performs an ending procedure of an activity then in progress in response. An example ending procedure of the activity is a process of confirming progress of a process being executed and obtaining necessary information if it has not been obtained. Alternatively, if a process being executed will finish in a short time, the ending procedure is to wait for completion of the process. Further, the ending procedure of the activity may be omitted in certain types of agents. As a further alternative, a process being executed may simply be forced to be terminated even during the execution upon reception of the notification from the second retraction processing module 29.

Figures 6, 10:
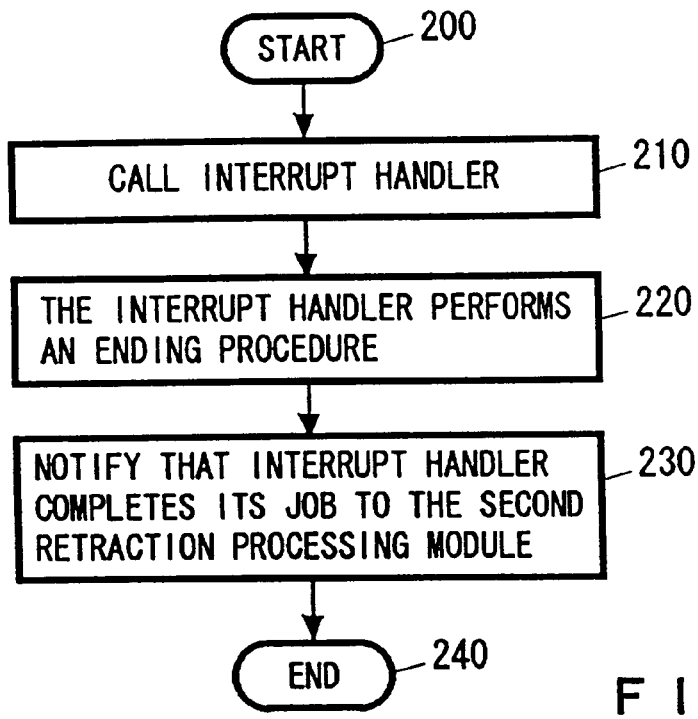
FIG. 6 is a flowchart showing an ending process of an activity of an agent.
FIG. 10 shows an example of agent movement destination table.

FIG. 6 shows an example of the above-identified ending procedure of the agent executed in response to receipt of the retraction request and the matching FIG. 5 table IDs. As shown, upon reception of the notification that the retraction request has been received, a call interrupt handler is called at step 210. At step 220, the call interrupt handler performs a given ending procedure such as described above. At step 230, the agent notifies the second retraction processing module 29 that the interrupt handler has completed the ending procedure.

There are two alternative methods for carrying out the function of Step 230. One method is for the agent 13b to have the notification procedure within so that, upon completion of the ending procedure of the activity, the agent 13b itself notifies the second retraction processing module 29 of that fact. An alternative method is by the second retraction processing module 29 having a sub-module (not numbered) for detecting completion of the ending procedure of the activity by monitoring the operation of the agent 13b. In either case, the second retraction processing module 29 causes the conversion module 27 to convert the agent 13b into a bit sequence.

The conversion module 27, after being notified of the ending procedure by step 230 or an equivalent, forwards the generated bit sequence to the communication module B, item 25. Communication module B then transmits the bit sequence 12 (see FIG. 3) to the execution environment that requested the retraction.

In one embodiment of the invention, the communication module B, item 25, awaits receipt of a reception acknowledgment from the execution environment that requested the retraction, communication module B 25 and, upon receiving the acknowledgment, disconnects the established connection. In embodiments not providing for or requiring receipt of the reception acknowledgment the communication module B 25 disconnects the established connection after transmitting the bit sequence 12.

FIG. 7 shows an example process flow this embodiment. At step 130, the execution environment 9 is a retraction source which transmits a connection establishment request to the execution environment 11 where an agent which is the subject of the retraction request exists. In response, the execution environment 11 establishes a connection at step 132. After establishment of the connection, the execution environment 9 at step 134 transmits, via the connection, a retraction request having the ID of the agent that is the retraction subject. An of the retraction request is shown as item 10 is FIG. 3. At step 136, the execution environment 11 receives the retraction request. At step 138, the execution environment 11 searches among the agents in that environment using the ID included in the retraction request. If step 138 does not find the subject agent as an agent under management of the execution environment 11, the execution environment 11 returns an error, shown by the dotted "error" line.

If, on the other hand, step 138 finds the subject agent as an agent under management of the execution environment 11, i.e., finds an agent in the environment 11 having the same ID as that in the retraction request, the execution environment 11 prepares, at step 140, a bit sequence of the found agent. More particularly, at step 140 the conversion module 27 converts the agent into a bit sequence if the agent is in an active state. If the agent is in an inactive state and, hence, has already been converted into a bit sequence, an operation of extracting that bit sequence is performed. At step 142, the execution environment 11 transmits the prepared bit sequence to the execution environment 9 as the retraction source. At step 144, the execution environment 9 receives the bit sequence. If the execution environment 9 has received the bit sequence without any problems, the connection is disconnected at steps 146 and 148.

The above description is directed to an example process according to the invention in which the execution environment that is the retraction source retracts an agent by communicating directly with the specified execution environment where the agent exists. However, as can is seen from the description above, there are cases in which the execution environment sending the retraction request receives an error (such as from step 138) because the step 138 search in FIG. 7 cannot find the requested agent as being an agent under management of the execution environment to which the request was sent. An alternative or a further embodiment, shown at FIG. 8, accommodates such a case.

Figure 8:
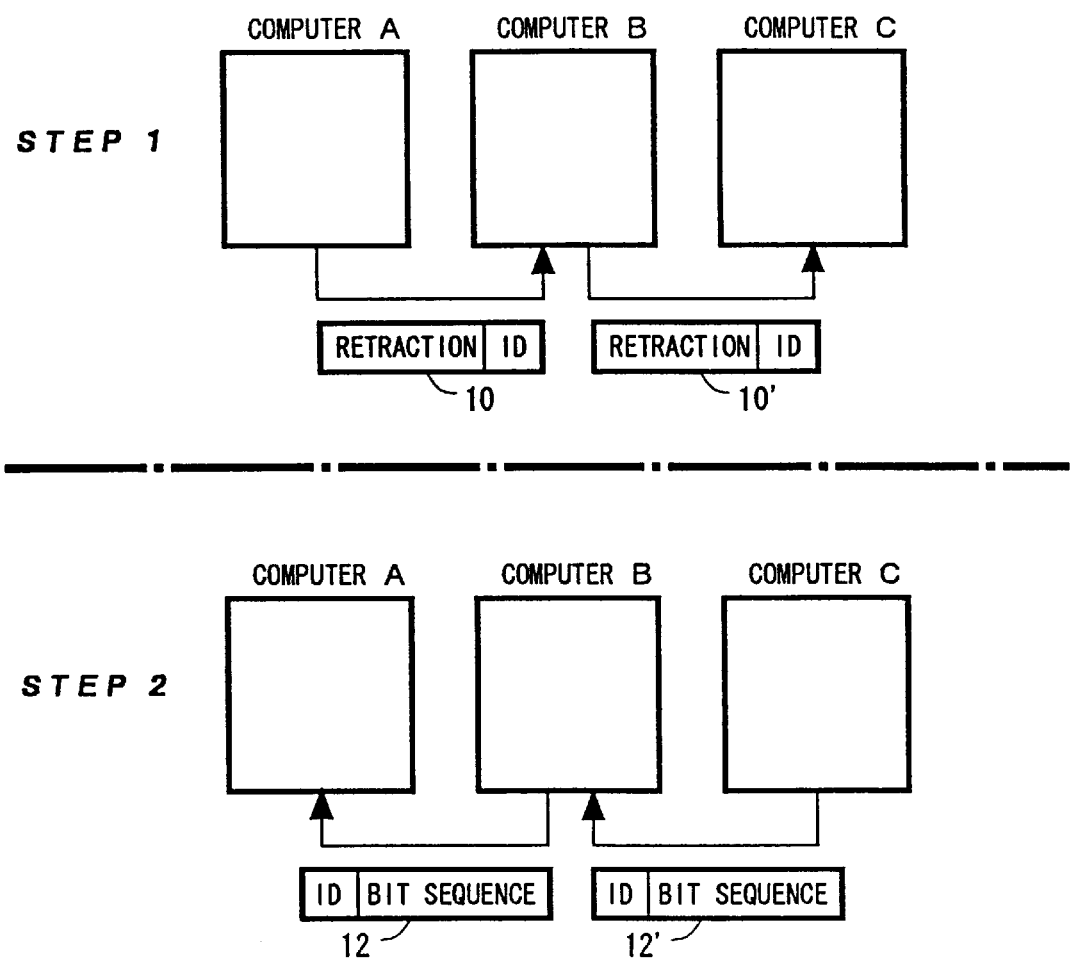
FIG. 8 illustrates a chain of retraction processes.

Referring to FIGS. 8 and 9, an example of the above-identified embodiment for handling such error cases from step 138 will be described. Referring first to FIG. 8, computers A, B, and C are connected to a network (not shown). Each of the computers A, B an C has an agent execution environment (not shown) such as, for example, the execution environments of FIGS. 1, 3, and 4. Computer A transmits a retraction request, labeled as item 10, to computer B. In the FIG. 8 example, though, the agent identified by retraction request 10 is no longer in the computer B execution environment and, instead, has already moved to computer C. For this embodiment computer B, and possibly computers A and C as well, has an additional table, as shown by FIG. 10, which keeps a record of agents that have moved from computer B's execution environment. Modules of computer B's execution environment, described below and shown by FIG. 9, search the additional table and, as shown by the example of FIG. 8 in which the agent has moved to computer C, send the repeater-type request shown as 10'. If the identified agent is found by computer C's execution environment, computer C transmits a bit sequence 12' of the intended agent to computer B. Computer B then transfers, at step 2 of FIG. 8, a bit sequence 12 of the agent to computer A, which is the original retraction source. The retraction request 10' and the bit sequence 12' are generated by a process substantially identical to the process shown on FIG. 7.

Referring to FIGS. 4, 9, and 10, an example process by which the execution environment 11 in computer B generates the request 10' of FIG. 8 will be described.

Referring to the previously described FIG. 6 and 7 processes, the second retraction processing module 29 shown in FIG. 4 operates therein to find an agent specified by a retraction request by checking the table of FIG. 5 for entries of activity status and location reflecting agents under management of the execution environment 11. In the present FIG. 8 embodiment, the table of FIG. 5 is enhanced by the table of FIG. 10, having entries representing agent movement destinations. The FIG. 10 table is, for this embodiment, within the first retraction processing module 15a of the environment 11 of FIG. 4. The FIG. 10 movement destination table lists agents that have moved from the execution environment 11, and lists their destination by, for example, the depicted URL type of address. The specific example of FIG. 10 shows that agent W and V have moved to "www-.yamato.trl.ibm.com" and "www.yorktown.ibm.com," respectively. The FIG. 10 agent movement destinations are managed, for example, by the communication module B, item 25, or by another module of the execution environment 11. Regarding the management, one alternative is, depending on design choice, that the movement destination table of FIG. 5 would omit listing movement destinations of agents that have been retracted. The FIG. 5 table, instead only lists movement destinations of active agents. Further, it is readily seen that over time, as agents are created, and as they enter into and move out of the execution environment, that the number of entries in the FIG. 5 table would, without maintenance, monotonically increase. Therefore, a table maintenance such as, for example, one or more of the general maintenance methods for status type tables that are well known in the art, can be used are preferable. For example, an entry whose storage time has exceeded a preset time may be deleted. Another example table maintenance, which avoids double entries, uses the same FIG. 5 entry location when a particular agent leaves the execution environment 11 a second time.

FIG. 9 shows the search process performed by the second retraction processing module 29 of computer B when it received the search request 10. Shown in FIG. 8. The process start at step 310, the second retraction processing module 29 checks whether the agent identified by the search request is under management of execution environment 11, whether the agent is in an active state, by referring to the table as shown in FIG. 5. If the agent is in an active state, the second retraction processing module 29, at step 320, notifies the agent of the reception of the retraction request. If the agent is not in an active state, the second retraction processing module 29 checks at step 350 whether the agent is under its own management or in an inactive state. If the agent is in an inactive state, the second retraction processing module 29 forwards a pointer retrieved from the FIG. 5 table to communication module B, and instructs the communication module B to acquire a bit sequence of the agent from a disk device.

The portion of the FIG. 9 procedure described above is identical to the procedure already described in reference to FIG. 7. However, for the FIG. 9 procedure, if the agent identified by the retraction request 10 is neither in an active state nor in an inactive state, the second retraction processing module checks the movement destination table shown in FIG. 10. If the destination table has an entry for the ID of the subject agent, which reflects where it moved to, the second retraction processing module 29, at step 360, extracts a corresponding destination address from the table and calls the first retraction processing module 15a. The first retraction processing module 15a causes communication module B, which is item 25 of FIG. 4, to establish a connection with a destination execution environment and then transmit another retraction request including the ID of the subject agent to the execution environment identified by the FIG. 5 destination address. If the destination address is, for example, computer C then, as shown by FIG. 8, the retraction request is the request 10' shown sent to that computer. The execution environment receiving the request such as 10' likewise searches for the subject agent and, if found, sends the corresponding bit sequence back to computer B, as shown by the bit sequence 12' of FIG. 8. The processes performed by the first retraction processing module 15a sending, for example, the request 10' to computer C, and of the computer C execution environment sending the bit sequence 12' to computer B in response, are identical to the processes described above in reference to FIG. 3 for the request 10 and bit sequence 12 and, therefore, these descriptions are not repeated here.

When successfully receiving a bit sequence of the agent from the destination execution environment, such as the bit sequence 12' from computer C shown in FIG. 8, the first retraction processing module 15a notifies the second retraction processing module 29 of the receipt, as described above for steps 144–148 of FIG. 7. The second retraction processing module 29 of computer B then instructs the communication module B, item 25, to transfer the received bit sequence of the agent to the execution environment as the original retraction source which, as shown by FIG. 8, is computer A.

Referring to FIG. 9, if the movement destination table of computer B has no entry, the second retraction processing module 29 has exhausted its search and, accordingly, instructs communication module B, item 25, to transmit an error at step 370.

The chain of retraction processes is performed in the above manner. It is noted that the above description is merely an example. For example, as for the management of the table as shown in FIG. 10, when an agent is activated on an execution environment, it is checked whether an activity ending procedure corresponding to a retraction request is prescribed in the agent. If the activity ending procedure is prescribed in the agent, it is possible to recognize it as an agent for which a retraction request will be issued and to store a movement destination when the agent moves.

Although in the above description the retraction module, the conversion module, and the communication module exist in an execution environment, the manner of separating these modules is arbitrary. For example, it is possible to modify the embodiments so that each of the above-described functions is possessed by one of the modules in the execution environment. Although the above description is shows only the example in which the conversion module 27 converts an agent into a bit sequence, the module 27 is readiliy modified to perform a reverse process of converting an agent bit sequence that is received from communication module B, item 25, into a form executable on the execution environment.

Further, programs for providing an execution environment may be stored in a disk device such as, example, the disk device 21 shown in FIG. 4, or may be stored in a floppy disk, a CD-ROM, or some other storage medium for distribution. Although the above description shows the case where a bit sequence of an agent is stored in the disk device 21, an agent may also be stored in a storage medium in the form of a bit sequence for transmission or storage.

Having thus described our invention, what we claim as new and desire to secure by Letters Patent is:

1. A computer for active and inactive mobile agents having an identity data ID, comprising:

computer means for establishing a first execution environment for the active and inactive mobile agents;

computer means for establishing a second execution environment for the active and inactive mobile agents;

a connection module associated with said first execution environment for establishing a connection from said first execution environment through a network to said second execution environment;

a retraction module associated with said first execution environment for transmitting a retraction request having an ID of an agent under management of the second execution environment, via the connection established by the connection module;

a module associated with said second execution environment for searching for an agent within said second execution environment corresponding to said ID and, based on a result of said search, transmitting a bit sequence representation of an agent corresponding to said ID;

notification means for notifying the mobile agent to be retracted if it is in the active state, otherwise forwarding means for forwarding the corresponding pointer of the mobile agent to be retracted to the communication module; and a module associated with said first execution environment for receiving the bit sequence via the established connection.

2. A computer system according to claim 1, wherein the second execution environment further comprises a conversion module for converting an agent being executed on the second execution environment into the bit sequence representation.

3. A computer system according to claim 2, wherein the conversion module converts the bit sequence into a form executable on the second execution environment.

4. A computer system for active and inactive mobile agents having an identity data ID, comprising:

a computer means for establishing a first execution environment for the active and inactive mobile agents, said first execution environment having a module for generating a first connection request and having a module for generating a first agent retraction request over a connection between the first and a second execution environments, the first agent retraction request having an agent ID;

a computer means for establishing the second execution environment for the active and inactive mobile agents;

a network connecting said first computer means to said second computer means, wherein said second execution environment includes:

a connection establishing module for establishing the connection through the network with the first execution environment in response to receiving the first connection request from the first agent execution environment;

a search module for performing a search of the agents under management of the second agent execution environment in response to reception of the first agent retraction request, and said retraction request being transmitted from the second agent execution environment via the established connection, and for generating a search result data representing a result of the search;

a conversion module for converting, in response to the search result data, an agent having an ID the same as the ID of the first retraction request into a bit sequence of said agent;

notification means for notifying the mobile agent to be retracted if it is in the active state, otherwise forwarding means for forwarding the corresponding pointer of the mobile agent to be retracted to the communication module; and a module for transmitting the bit sequence to the first execution environment via the established connection.

5. A computer system according to claim 4, wherein the search module of the second execution environment comprises:

a module for searching among agents being executed on the second execution environment for an agent having an ID corresponding to the ID of the first retraction request and for generating a first search result in response; and a module for notifying, based on the first search result, the agent being executed having an ID corresponding to the ID in the first retraction request of reception of the first retraction request.

6. A computer system according to claim 4, wherein the second computer means comprises a storage means for storing agents in an inactive form, and wherein the conversion module for the second execution environment converts agents into an inactive form, stores the inactive form agents in the storage means, retrieves the inactive form agents from the storage means, and converts the retrieved inactive form into an active form for execution in the second execution environment;

an agent status table for storing a plurality of agent status entries representing a status and a record of agents with the second execution environment, said agent status entries each including an ID of an agent, an active/inactive status data for said agent, and a storage location in the storage means for an inactive form of the agent;

a module for maintaining the active/inactive status data and storage location entries in the agent status table, the entries corresponding to the conversion module's converting, storage, retrieving and and reconverting operations;

a module for searching the agent status table based on the first retraction request and for generating the search result data based on said searching; and a module for notifying the transmitting module, based on the search result data, of the storage location of an agent indicated by the agent status table as having an inactive form stored in the storage medium at said location, and wherein the transmitting module has provision for transmitting the bit sequence from said location to the first execution environment.

7. A computer system according to claim 4, further comprising a computer means for establishing at least one other execution environment for the mobile agents, and wherein the second computer means has an agent movement status table for storing a plurality of agent movement entries, each entry having an ID of an agent moved from the second execution environment to a destination execution environment among said another execution environments, and each entry having a destination data identifying the destination execution environment, and wherein the second execution environment further comprises:

a module for maintaining the movement entries in the movement status table according to movement of agents from said second execution environment;

a module for searching the movement status table based on the first retraction request and for generating a location search result data based on said searching, the location search result data identifying any entry in the movement status table having an ID corresponding to an ID of the first retraction request and the destination data of said entry;

a second connection establishing module for establishing a connection through the network with a destination execution environment corresponding to the destination data of said entry identified by the location search result data; and a module for generating a second retraction request, having an ID corresponding to the first retraction request and for transmitting said second retraction request to said destination execution environment via the connection established by the second connection establishment module.

8. A computer system according to claim 7, wherein the movement status table does not store entries for movement of agents moving from the second execution environment in response to a retraction request.

9. A computer system according to claim 5, wherein the second execution request further comprises a module for generating a notification that the first retraction request has been received, and further comprising an agent on the second execution environment having an ending operation module which receives said notification and, in response, executes an ending operation for a retraction of said agent to the first execution environment.

10. A computer system according to claim 9, wherein said agent further comprises a module for notifying the first agent execution environment that a process of the ending operation module has finished.

11. A storage medium for storing a bit sequence of active and inactive mobile agents, said agents comprising:

a predefined ending operation method for a retraction, said predefined ending operation invoked in response to a notification that is output from a first agent execution environment when the first agent execution environment receives a retraction request including an ID of an active or inactive mobile agent via a connection with a second agent execution environment.

12. An active or inactive mobile agent retracting method which is executed by a first agent execution environment in a first computer system connected to a network to retract an active or inactive mobile agent from a second agent execution environment in a second computer system connected to the network, the active or inactive mobile agent retracting method comprising the steps of:

establishing a connection with the second agent execution environment;

transmitting a retraction request including an ID of an agent under management of the second agent execution environment via the established connection;

notifying the mobile agent to be retracted if it is in the active state, otherwise forwarding the corresponding pointer of the mobile agent to be retracted to the communication module; and receiving a bit sequence of the active or inactive mobile agent having the ID transmitted from the second agent execution environment via the established connection.

13. An active or inactive mobile agent returning method which is executed by a first agent execution environment in a first computer system connected to a network to return an active or inactive mobile agent to a second agent execution environment in a second computer system connected to the network, the active or inactive mobile agent returning method comprising the steps of:

establishing a connection with the second agent execution environment in response to a connection establishment request from the second agent execution environment;

searching among active and inactive mobile agents under management of the first agent execution environment in response to reception of a retraction request including an ID of an active or inactive agent, said retraction request transmitted from the second agent execution environment via the established connection;

transmitting a retraction request including an ID of an agent under management of the second agent execution environment via the established connection; and notifying the mobile agent to be retracted if it is in the active state, otherwise forwarding the corresponding pointer of the mobile agent to be retracted to the communication module.

14. An agent returning method according to claim 13, wherein the searching step comprises the steps of:

searching among agents being executed; and notifying the agent having the same ID as said ID in the retraction request of reception of the retraction request if the agent having the same ID is being executed.

15. An agent returning method according to claim 14, wherein the searching step comprises the steps of:

searching among agents not being executed; and taking out and transmitting a bit sequence of the agent having the same ID as said ID in the retraction request if the agent having the same ID is not being executed.

16. An agent returning method according to claim 14, further comprising the steps of:

storing an ID of an agent and a destination address thereof in a storage area, wherein the searching step comprises the steps of:

searching the storage area; and establishing a connection with a third agent execution environment that is the destination of the agent having the same ID as said ID in the retraction request if the agent having the same ID has already moved.

17. An agent returning method according to claim 14, further comprising the steps of:

said agent having the same ID as said ID in the retraction request receiving a notification that the retraction request has been received; and said agent performing an ending operation for the retraction.

18. A storage medium for storing a program to be executed in a computer system connected to a network, said storage medium including a program for providing a first agent execution environment, said program comprising the steps of:

causing the first computer system to establish a connection with a program for providing a second agent execution environment in a second computer system connected to the network;

causing the computer system to transmit, via the established connection, a retraction request including an ID of an active or inactive agent under management of the program for providing the second agent execution environment;

notifying the mobile agent to be retracted if it is in the active state, otherwise forwarding the corresponding pointer of the mobile agent to be retracted to the communication module; and causing the computer system to receive a bit sequence of the active or inactive agent having the ID transmitted from the program for providing the second agent execution environment via the established connection.

19. A storage medium according to claim 18, said program further comprising the step of:

causing the computer system to convert an agent being executed on the first agent execution environment into a bit sequence.

20. A storage medium for storing a program to be executed in a computer system connected to a network, said storage medium including a program for providing a first agent execution environment, said program comprising the steps of:

causing the first computer system to establish a connection with a program for providing a second agent execution environment in a second computer system connected to the network in response to a connection establishment request from the program for providing the second agent execution environment;

causing the computer system to search among active or inactive agents under management of the program for providing the first agent execution environment in response to reception of a retraction request including an ID of an agent, said retraction request transmitted from the program for providing the second agent execution environment via the established connection;

notifying the mobile agent to be retracted if it is in the active state, otherwise forwarding the corresponding pointer of the mobile agent to be retracted to the communication module; and causing the computer system to transmit a bit sequence of an active or inactive agent having the same ID as said ID in the retraction request via the established connection.

21. A storage medium according to claim 20, wherein the causing to search step comprises the steps of:

causing the computer system to search among agents being executed; and causing the computer system to notify the agent having the same ID as said ID in the retraction request of reception of the retraction request if the agent having the same ID is being executed.

22. A storage medium according to claim 20, wherein the causing to search step comprises the steps of:

causing the computer system to search among agents not being executed; and causing the computer system to take out and transmit a bit sequence of the agent having the same ID as said ID in the retraction request if the agent having the same ID is not being executed.

23. A storage medium according to claim 20, said program further comprising the step of:

causing the computer system to store an ID of an agent and a destination address thereof in a storage area, wherein the causing to search step comprises the steps of:

causing the computer system to search the storage area; and causing the computer system to establish a connection with a third agent execution environment that is the destination of the agent having the same ID as said ID in the retraction request if the agent having the same ID has already moved.

\* \* \* \* \*